(12) United States Patent
Ray (10) Patent No.: US 11,227,132 B1
(45) Date of Patent: *Jan. 18, 2022

(54) CONTROLLED-ENVIRONMENT FACILITY LOCATION ANALYTICS SYSTEM

(71) Applicant: Securus Technologies, Inc., Carrollton, TX (US)

(72) Inventor: Dionisia Ray, Dallas, TX (US)

(73) Assignee: Securas Technologies, LLC, Carrollton, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/724,887

(22) Filed: Dec. 23, 2019

Related U.S. Application Data (63) Continuation of application No. 15/626,531, filed on Jun. 19, 2017, now Pat. No. 10,515,243.

(51) Int. Cl.
    *G06K 7/10*     (2006.01)

(52) U.S. Cl.
    CPC ................ *G06K 7/10415* (2013.01)

(58) Field of Classification Search
    CPC ........... G06K 7/10415; G06K 7/10425; G06K 7/10475; G06T 19/20; G07C 9/00111
    See application file for complete search history.

(56) References Cited

U.S. PATENT DOCUMENTS

| | | |
|---|---|---|
| 2006/0028552 A1 | 2/2006 | Aggarwal et al. |
| 2012/0218080 A1 | 8/2012 | Gu et al. |
| 2013/0314210 A1 | 11/2013 | Schoner et al. |
| 2015/0057981 A1 | 2/2015 | Gross |
| 2015/0145643 A1 | 5/2015 | Fadell et al. |
| 2015/0325101 A1* | 11/2015 | T. ............................. G07C 9/28 340/539.13 |

FOREIGN PATENT DOCUMENTS

ES      2275417 A1      6/2007

* cited by examiner

*Primary Examiner* — Laura A Gudorf
(74) *Attorney, Agent, or Firm* — Fogarty LLP (57) ABSTRACT

A location-based analytics system provides tracking and visualization of individuals within a controlled-environment facility. A plurality of sensors, such as RFID (Radio Frequency Identification) sensors, are located within the controlled-environment facility and detect individuals located within a first proximity to the sensors. An analytics system determines the identity of individuals detected by the sensors and reports the locations of the identified individuals. A user interface provides the ability to select the display of the location and movement of selected individuals of the identified individuals on a three-dimensional model of the controlled-environment facility. The user interface also provides the ability to select a three-dimensional representation for the selected individuals and various other aspects of the controlled-environment facility. The selected representation of the selected individuals is projected onto the three-dimensional model of the controlled-environment facility at locations corresponding to the reported locations of the selected individuals within the facility.

20 Claims, 3 Drawing Sheets

CONTROLLED-ENVIRONMENT FACILITY LOCATION ANALYTICS SYSTEM

CROSS-REFERENCE TO RELATED APPLICATION

This is a continuation of, and claims benefit of, U.S. patent application Ser. No. 15/626,531, also entitled Controlled Environment Facility Location Analytics System, filed Jun. 19, 2017 and issued as U.S. Pat. No. 10,515,243 on Dec. 24, 2019, which is hereby incorporated herein by reference.

TECHNICAL FIELD

The following description relates generally to the management of a controlled environment facility, and, more particularly, to monitoring and analyzing the movement of individuals in a controlled environment facility.

BACKGROUND OF THE INVENTION

Various types of controlled environment facilities are present in today's society for the supervision and care of residents that are housed by the facilities. Individuals may be voluntary or involuntary residents of such facilities, and an individual may be housed by a controlled environment facility on a temporary or a permanent basis. Controlled environment facilities may include, for example, correctional institutions (e.g., municipal jails, county jails, state prisons, federal prisons, military stockades, juvenile facilities, detention camps, home incarceration environments, etc.), certain healthcare facilities (e.g., certain hospitals and nursing homes, certain mental health facilities, certain rehabilitation facilities, such as drug and alcohol rehabilitation facilities, etc.) and certain restricted living quarters (e.g., barracks, certain dormitories, etc.).

A controlled environment facility typically limits the movement of individuals, including both the movement of individuals within the different areas of the facility and the movement of individuals entering and leaving the facility. Despite these restrictions on the movement of individuals, a controlled environment facility typically includes a near constant flow of individuals within the facility and entering or leaving the facility. Staff members of a controlled environment facility supervise and enforce such limitations on the movement of individuals. Staff members of a controlled environment facility are also responsible for the care of residents, which requires adequate distribution of staff member resources throughout the facility.

BRIEF SUMMARY

In various embodiments, a location-based analytics system for operation in a controlled-environment facility includes: a three-dimensional model of the controlled-environment facility; a plurality of sensors located within the controlled-environment facility, wherein each of the plurality of sensors is configured to detect individuals located within a first proximity to the sensor; an analytics system configured to determine the identity of the individuals detected by the plurality of sensors and further configured to report a location of the identified individuals within the controlled-environment facility; a user interface providing the ability to select the display of the location of selected individuals of the identified individuals, and further configured to select a three-dimensional representation for the selected individuals; and a graphics generator configured to generate the selected three-dimensional representation of the selected individuals on the three-dimensional model, wherein the three-dimensional representation of the selected individuals is projected at a location on the three-dimensional model corresponding to the reported location of the selected individuals within the controlled-environment facility.

In various additional embodiments of the location-based analytics system, the three-dimensional model is a physical scale model of the controlled-environment facility. In various additional embodiments of the location-based analytics system, the three-dimensional model is a computer-based model of the controlled-environment facility. In various additional embodiments of the location-based analytics system, the system further includes: a three-dimensional projector configured to project the three-dimensional representations of the selected individuals on the physical scale model. In various additional embodiments of the location-based analytics system, the plurality of sensors comprises RFID (Radio Frequency Identification) detectors configured to detect RFID chips worn by the individuals. In various additional embodiments of the location-based analytics system, the system further includes a plurality of cameras located within the controlled-environment facility, wherein each of the plurality of cameras is configured to capture images of individuals located within a second proximity to the camera; and an image analytics system configured to determine the identity of the individuals in the captured images and further configured to report a location within the controlled-environment facility of the individuals identified in the captured images. In various additional embodiments of the location-based analytics system, the one or more of the plurality of cameras is a component of a communications terminal located within the controlled-environment facility. In various additional embodiments of the location-based analytics system, the graphics generator is further configured to generate a representation of one or more controlled areas of the controlled-environment facility on the three-dimensional model of the controlled-environment facility. In various additional embodiments of the location-based analytics system, a first classification of the individuals is prohibited from entering a first controlled area of the one or more controlled areas. In various additional embodiments of the location-based analytics system, the graphics generator is further configured to generate the display of an alert condition on the three-dimensional model of the controlled-environment facility, wherein the alert condition is displayed at a location of the three-dimensional model corresponding to the reported location of a first individual of the first classification of individuals within the first controlled area.

In various embodiments, a method for providing a location-based analytics and visualization system for operation in a controlled-environment facility includes: detecting individuals located within a first proximity to one or more sensors located within the controlled-environment facility; determining the identity of the individuals detected by the one or more of sensors; reporting a location of the identified individuals within the controlled-environment facility; providing a selection of the display of the location of selected individuals of the identified individuals on a three-dimensional model of the controlled-environment facility; providing a selection of a three-dimensional representation for the selected individuals; and generating the selected three-dimensional representation of the selected individuals on the three-dimensional model, wherein the three-dimensional representation of the selected individuals is projected at a location on the three-dimensional model corresponding to the reported location of the selected individuals within the controlled-environment facility.

In various additional embodiments of the method, the three-dimensional model is a physical scale model of the controlled-environment facility. In various additional embodiments of the method, the three-dimensional model is a computer-based model of the controlled-environment facility. In various additional embodiments of the method, the three-dimensional representations of the selected individuals are projected on the physical scale model using a three-dimensional projector. In various additional embodiments of the method, the plurality of sensors comprises RFID (Radio Frequency Identification) detectors configured to detect RFID chips worn by the individuals. In various additional embodiments of the method, the method further includes: capturing images of individuals located within a second proximity to one of a plurality of cameras located within the controlled-environment facility; determining the identity of the individuals in the captured images; and reporting a location within the controlled-environment facility of the individuals identified in the captured images. In various additional embodiments of the method, the one or more of the plurality of cameras is a component of a communications terminal located in the controlled-environment facility. In various additional embodiments of the method, the method further includes generating a representation of one or more controlled areas of the controlled-environment facility on the three-dimensional model of the controlled-environment facility. In various additional embodiments of the method, a first classification of the individuals is prohibited from entering a first controlled area of the one or more controlled areas. In various additional embodiments of the method, the method further includes generating a display of an alert condition on the three-dimensional model of the controlled-environment facility, wherein the alert condition is displayed at a location of the three-dimensional model corresponding to the reported location of a first individual of the first classification of individuals within the first controlled area.

BRIEF DESCRIPTION OF THE DRAWINGS

Having thus described the invention in general terms, reference will now be made to the accompanying drawings, which are not necessarily drawn to scale, and wherein:

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention As described, controlled environment facilities may include various types of correctional institutions, healthcare facilities and restricted living quarters. For convenience of explanation, various examples discussed herein are presented in the context of specific types of controlled environment facilities. For instance, in some of the embodiments discussed below, a controlled environment facility may be referred to as a correctional facility that houses residents that may be referred to as inmates. In other embodiments, a controlled environment facility may be referred to as a nursing facility. It should be understood, however, that the systems and methods described herein may be similarly applicable to other types of controlled environment facilities and their respective residents.

Figure 1:
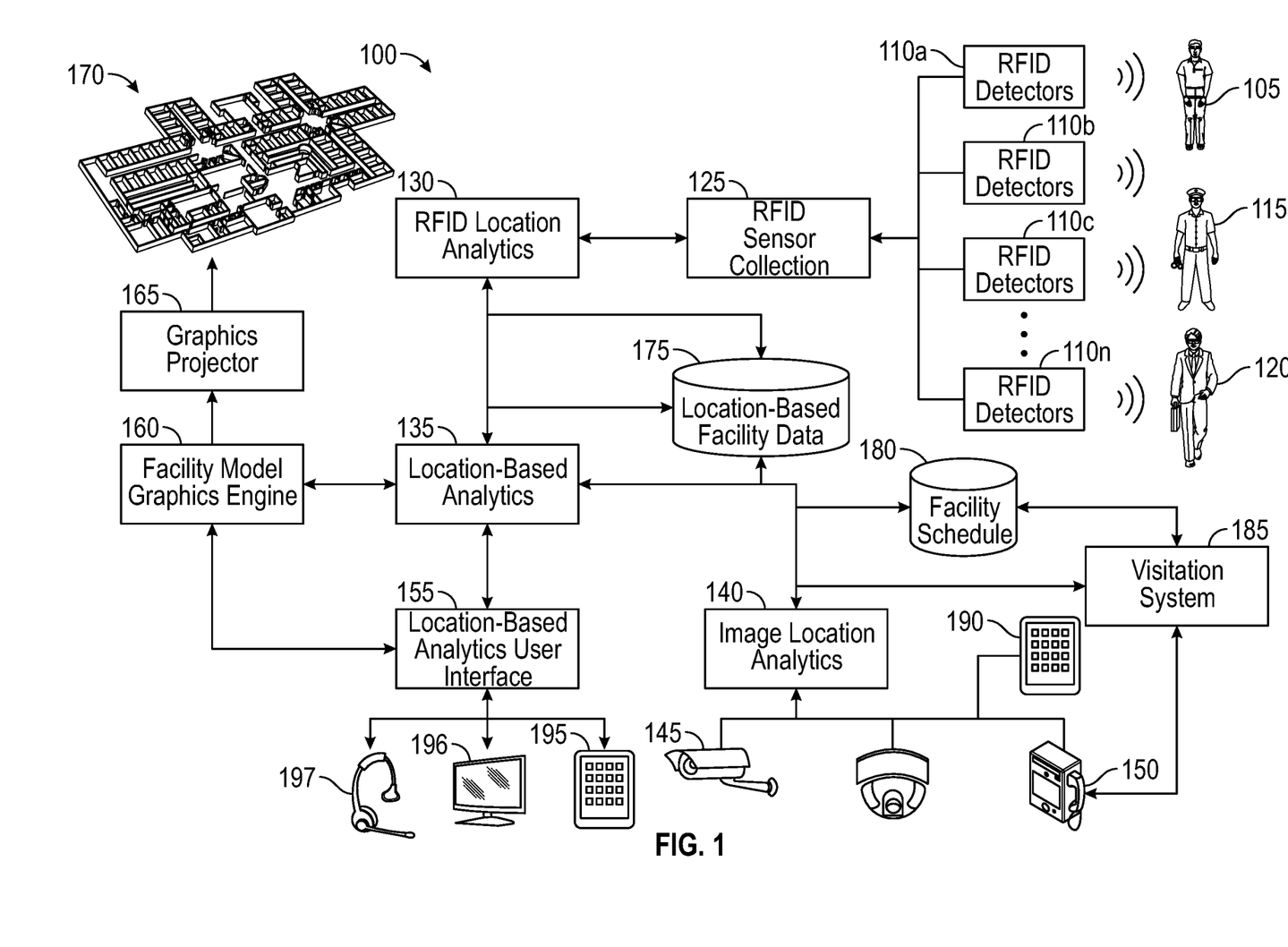
FIG. 1 is a diagram illustrating certain components of a location-based analytics system for a controlled environment facility according to various embodiments.

FIG. 1 is a diagram illustrating certain components of a location-based analytics system 100 provided, according to various embodiments, within a controlled environment facility. The location-based analytics system 100 provides the ability to visualize the location and movement of individuals 105, 115, 120 within a controlled environment facility. More specifically, the location-based analytics system 100 provides the ability to monitor and visualize the location and movement of residents 105, staff members 115, and visitors 120 within a controlled environment facility. The location-based analytics system 100 may utilize various different systems described with respect to FIG. 1 in order to collect location information pertaining to the individuals 105, 115 and 120 within the controlled environment facility. The collected location information may then be visualized on a three-dimensional model 170 of the controlled environment facility. In addition, various other types of information about the different areas of the controlled environment facility and the systems implemented within the controlled environment facility may also be displayed on the facility model 170.

As described, a controlled environment facility may be a correctional facility that houses residents 105, that may be referred to as inmates. In a correctional facility, inmates may be required to wear devices, such as ankle bracelets, that are not removable by the inmates. In other types of controlled environment facilities, residents 105 may likewise be required various other types of wearable devices that may or may not be removable by the resident. Such wearable devices may be used to identify a resident 105, and may also be used to track the location of the resident. In certain scenarios, the wearable device may include a memory that may be used to store various types of information, such as information about the resident 105. In certain scenarios, these wearable devices may include an RFID (Radio Frequency Identification) chip or tag that serves to uniquely identify a resident 105. In certain scenarios, an RFID chip or tag may be reassigned to another resident, in which case the unique RFID assignments are updated to reflect the new assignment.

A controlled environment facility is run by various staff members 115 that supervise and care for the residents 105. In a correctional facility, the staff members 115 may include the various guards, medical staff, maintenance staff, administrators, counselors, and other personnel with access to the facility. Certain staff members 115, such as guards, may enter all areas of the correctional facility, while certain other staff members 115, such as administrators, may enter very few areas of the correctional facility. While on duty at the correctional facility, the staff members 115 may be required to wear an RFID chip or tag that serves to uniquely identify an individual staff member. Similar to the non-removable RFID device worn by residents 105, the RFID device worn by staff members 115 may include a memory that may be used to store various types of information, such as information about the staff member 115, and may be battery-powered. In certain scenarios, an RFID chip or tag may be reassigned to another staff member, in which case the unique RFID assignments are updated to reflect the new assignment.

The residents 105 of the controlled environment facility may receive visitors 120. In a controlled environment facility, visitors 120 may include friends and family of the resident 105 that may be allowed to visit under various conditions. As part of the conditions for visiting a controlled environment facility, visitors 120 may be required to wear a form identification, such as a badge, sticker, or bracelet, which identifies the individual as a visitor. In certain embodiments, the wearable identification provided to the visitors 120 may include an RFID chip that identifies the individual as a visitor. In certain of such embodiments, the wearable identification may uniquely identify the visitor 120 based on information provided by the visitor 120 upon arrival at the controlled environment facility, or based on information previously provided by the visitor 120.

In certain scenarios, a visitor 120 may be an individual such as an attorney or medical professional that is visiting the controlled environment facility to provide services to the resident 105. Such professionals 120 that visit a controlled environment facility may likewise be required to wear a form of identification that includes an RFID chip. Certain of such professionals 120 that visit a controlled environment facility on a repeated basis may be assigned a wearable device that includes an RFID chip. Other visitors 120 to a controlled environment facility that may likewise be required to wear an RFID chip may include outside contractors that are providing various services to the controlled environment facility, such as repairs and improvements to the facility. Various other types of visitors 120 may be authorized to enter the controlled environment facility on a temporary basis on the condition that the visitor wears a form of identification that includes an RFID chip.

An RFID wearable device allows an individual 105, 115, and/or 120 to be identified using an RFID detector 110a-n. In certain embodiments, an array of RFID detectors 110a-n may be disbursed throughout the controlled environment facility. As described in additional detail with regard to FIGS. 2 and 3, RFID detectors 110a-n may be placed at various points throughout a controlled environment facility, such as passageways between separate secured areas of the controlled environment facility. The RFID detectors 110a-n may be organized into various different networks and subnetworks in order to support their distribution throughout the various areas of the controlled environment facility. In certain embodiments, one or more of the RFID detectors 110a-n may be active devices that emit interrogating signals seeking a reply from an RFID chip worn by an individual 105, 115, and/or 120. In certain embodiments, one or more of the RFID detectors 110a-n may be passive devices that are configured to detect signals emitted from a powered RFID chip.

As described in further detail, RFID detectors 110a-n may take on many forms in addition to RFID readers positioned at passageways between controlled areas of the facility. For instance, RFID detectors 110a-n may be located at various other strategic locations throughout the controlled environment facility. Each time one of the RFID detectors 110a-n detects the presence of an RFID chip, the RFID detectors 110a-n may be configured to read additional information made available by the RFID chip, including certain information stored in a memory of the RFID chip. The RFID detectors 110a-n may timestamp and log the information that is received from the RFID chip. The log information may be stored by an RFID detector 110a-n to a local memory used to store log information until it can be transferred to a sensor collection point 125. In certain scenarios, the information read from an RFID chip may be immediately forwarded by an RFID detector 110a-n to an RFID sensor collection system 125. The controlled environment facility may utilize one or more sensor collection points that are located throughout the facility and which form a RFID sensor collection system 125 that collects and temporarily stores the location information collected by the RFID detectors 110a-n.

In this manner, the RFID detectors 110a-n may be used to generate a record of the movements of individuals 105, 115, and/or 120 throughout the controlled environment facility. In the illustrated embodiment, the RFID detection information collected via the RFID sensor collection system 125 is reported to a RFID location analytics system 130 which processes the received location information and stores the location information to a location-based facility database 175. The RFID location analytics system 130 may be configured to summarize and aggregate collected RFID location reports, rather than store every RFID location report to the location-based facility database 175.

In certain embodiments, the RFID location analytics system 130 may be configured to identify certain high-priority location-based violations that warrant immediate reporting to the location-based analytics user interface 155. For instance, the detection of an RFID chip assigned to a resident 105 at an RFID detector 110a-n located at an exit point of the controlled environment facility may be detected by the RFID location analytics system 130, and may be reported immediately to the location-based analytics system 135, which in turn may display an alert via the user interface 155 and/or the facility model 170. In scenarios where the alert is displayed via the facility model 170, the location-based analytics system 135 may direct the facility model graphics engine 160 to select specified visualization settings to be used for such alerts.

Using information describing the alert that is provided by the location-based analytics system 135, the facility model graphics engine 160 may select an alert visualization to be projected on the facility model 170 by a graphics projector 165. In the described scenario, the location of the location RFID detector 110a-n reporting the detection of an RFID chip assigned to a resident 105 at an exit location may be displayed on the facility model 170, in addition to various other information such as identification of the resident 105, the location of the nearest staff members 115, and/or the locations of all visitors 120. In another alert scenario, the RFID location analytics system 130 may immediately report the detection of any RFID chip assigned to a visitor 120 by an RFID detector 110a-n located outside of a designated visitation area. In such a scenario, the location-based analytics system 135 may direct the facility model graphics engine 160 to display an alert scenario on the facility model 170, such as the location of the RFID detector 110a-n reporting the RFID chip assigned to the visitor 120, information describing the visitor 120, and the location of one or more residents 105 associated with the visitor 120.

In addition to the location information collected via the RFID detectors 110a-n, certain embodiments of the location-based analytics system 100 may utilize other techniques for monitoring the location of individuals within a controlled environment facility. In the illustrated embodiments, an image analytics system 140 that utilizes images captured from various cameras 145 and 150 located throughout the controlled environment facility. In certain scenarios, one or more surveillance cameras 145 may be located in various locations throughout the controlled environment facility represented by the facility model 170. For instance, surveillance cameras 145 may be located within and around the various buildings that comprise a controlled environment facility and may also be located throughout the grounds and perimeter of the controlled environment facility.

In certain embodiments, images captured by the surveillance cameras 145 may be transmitted to an image analytics server 140 that is configured to utilize a facial recognition system to identify individuals in these captured images. In such embodiments, the image analytics server 140 may consult a library of images that includes images of the individuals 105, 115, and 120 that are authorized to be within the controlled environment facility. In certain scenarios, a photograph may be taken of each resident 105, staff member 115 and visitor 120 as a condition of entry into the controlled environment facility. Such images of the individuals 105, 115, and 120 that enter the controlled environment facility may be used by the facial recognition system utilized by the image analytics server 140 in order to identify individuals present in images captured by the surveillance cameras 145. In this manner, the image analytics server 140 may provide location information for individuals 105, 115, 120 within the controlled environment facility.

In certain embodiments, a controlled-environment facility may include a visitation system 185 that is used to provide residents 105 with visitation services. In particular, the visitation system 185 may provide residents 105 with video communication services, such as video visitations with non-residents. In certain instances, a resident 105 may participate in a video visitation with a non-resident that is located remotely from the controlled environment facility. In other instances, a resident may participate in video visitation with a visitor 120 to the controlled environment facility. In other scenarios, the resident 105 may participate in video visitations via the exchange of recorded video messages with non-residents.

In certain embodiments, the video visitation services may be provided to residents 105 via a communications terminal 150. In certain scenarios, the communications terminal 150 may be mounted on a wall, within a booth, or as part of kiosk. Communications terminal 150 may provide residents with the ability to place voice calls and to participate in video visitation sessions. In certain embodiments, such a communications terminal 150 may be referred to as an Intelligent Facility Device (IFD), which may include a video phone particularly adapted for use in a controlled environment facility. A communications terminal 150 may be adapted to provide residents with various services in addition to voice and video visitation sessions. In certain scenarios, the communications terminal 150 may be a hardened terminal and may be installed in an area of the controlled environment facility dedicated to providing residents 105 with visitation sessions.

In various embodiments, a communications terminal 150 may include a video display, a camera, and a handset that includes a microphone and speakers. The camera included on the communications terminal 150 may be any suitable imaging device suitable for capturing photographs and/or video, such as a video camera or webcam equipped with Charge-Coupled Devices (CCDs) and/or Complementary Metal-Oxide-Semiconductor (CMOS) active pixel sensors.

During a video visitation session, communications terminal 150 may be configured to utilize the camera to capture video or images of the resident 105 and, via the visitation system 185, transmit audio and the captured video or images to the device used by the non-resident. In certain video visitation sessions, the camera of the communications terminal 150 may be used to capture live video that is transmitted to the device of the nonresident, while certain other video visitation sessions may restrict the use of the camera for taking a limited number of snapshots that are transmitted to the device of the nonresident.

In certain embodiments, the cameras of the communication terminals 150 that are dispersed throughout the controlled environment facility may be used to capture images that are provided to the image analytics server 140. As with the images captured by the surveillance cameras 145, the images captured by the communication terminals 150 may likewise be used by the image analytics server to identify individuals present in the images. In certain embodiments, images may be captured by the camera of a communication terminal 150 at various points during a visitation session conducted using that communication terminal. In certain of such embodiments, images may be captured by the camera of the communication terminal 150 during voice visitation sessions conducted using the communications terminal 150. In certain embodiments, images may be captured by the camera of the communication terminal 150 in response to the detection of motion near the communication terminal 150.

In certain embodiments, the visitation system 185 may provide residents 105 of the controlled-environment facility with voice communication services using a portable communication device 190. In certain embodiments, the portable communication device 190 may be a personal wireless device, such as a tablet device. Similar to the communications terminal 150, the portable communications device 190 may likewise include a camera and may be used both for voice visitation sessions and video visitation sessions. The portable communications device 190 may be especially adapted for use by residents of a controlled environment facility. For instance, the portable communications device 190 may be protected within a hardened case that prevents any modifications to the hardware of the device. Various features of the hardware and/or software of the portable communications device may be modified in order to prevent unauthorized use of the device. For instance, in a correctional institution, a portable communications device 190 may operate using a specially adapted operating system or operating system kernel. A portable communications device 190 adapted for use in a controlled environment facility may provide staff members 115 the ability to access the camera of the portable communication device at any time. The portable communication device 190 may be assigned for use by a resident on a temporary or permanent basis.

A portable communication device 190 may also be restricted with respect to the network connectivity that is afforded to a resident of the controlled environment facility. For instance, a portable communication device 190 may be configured to only connect to a network provided by the controlled environment facility. A portable communication device 190 may be further restricted to only connect to networks available within certain areas within a controlled environment facility, such as a dedicated visitation area or other supervised area. In certain scenarios, network connectivity for a portable communication device 190 may be provided by placing wireless access points and positioning directional antenna within the physical structure of the controlled environment facility such that the generated wireless signals are restricted to limited areas within the facility.

In certain embodiments, the location of the resident may be determined based on the location of a portable communication device 190 assigned to the resident. In certain embodiments, the wireless access points to provide wireless connectivity to the portable communication devices 190 are configured to monitor certain network information that is reported to a location-based network analytics server which collects information that may be used to track the location of a portable communication device 190. For instance, in certain embodiments, each network session hosted by a wireless access point and each attempt to establish a network session may be reported by the wireless access point to the location-based network analytics server. In certain embodiments, the wireless access point may be configured to periodically broadcast a location tracking signal to which the portable communication devices 190 are configured to respond. Such location information may be collected and aggregated by the location-based network analytics server to the location of portable communication devices 190 within the controlled environment facility. This location information may then be reported to the location-based facility data 175, from which the location-based facility analytics server 135 may provide the display of this location data on the facility model 170.

The location-based analytics system 100 may include a user interface 155 that allows a user to select the display of specific location-based information on the facility model 170. In certain embodiments, the facility model 170 may be a physical model of a controlled environment facility. In other embodiments, the facility model 170 may be a computer-generated model of a controlled environment facility that may be viewed on a display device and manipulated via the user interface 155. In other embodiments, the facility model 170 may include both a physical model and a computer model of the controlled environment facility. The user interface 155 provides the user the ability to select the display of location-based information on a facility model 170, whether the facility model 170 is a physical model and/or a computer model of a controlled environment facility.

In certain embodiments, the user interface 155 may include a graphical user interface that provides various menus and search options that allow a user to select location-based information for display on the facility model 170, such as the current location of one or more individuals within the controlled environment facility. Embodiments may support the use of various devices for operating the user interface 155. For instance, in certain embodiments the user interface 155 may be displayed on a desktop display 196, or a similar wall-mounted display or projected display, thus allowing a staff member 115 to utilize mouse and/or keyboard inputs for operating the user interface 155. In certain embodiments, the user interface 155 may be displayed on a mobile device 195 that may be utilized by staff members 115 throughout the controlled environment facility. In embodiments where the facility model 170 is fully or partially a computer-generated model, the computer-generated portion of the facility model 170 may be displayed on the display device 196 and/or mobile device 195, and may be incorporated into the user interface 155.

In certain embodiments, the user interface 155 may also include an audio interface 170 that allows the staff member 115 to select location-based information for display via voice commands. In certain of such embodiments, the user interface 155 may provide the user with audio prompts and responses via the use of a speech synthesis system configured to receive audio inputs 197 and configured to assist a staff member 115 in searching and selecting location-based information for display on the facility model 170. In certain embodiments, the user interface 155 may provide a staff member 115 with various audio information 197 pertaining to a staff member's 115 selection of location-based information for display on the facility model 170. Such audio information 197 may include signaling alert conditions and/or providing auditory responses to queries and selections made by a staff member 115.

Based on the selections made via the location-based analytics user interface 155, the facility model graphics engine 160 may be used to select the items to be displayed on the facility model 170. The facility model graphics engine 160 may receive inputs made by the user interface 155 that request the display of various different types of specific location-based information on the facility model 170. For instance, the user interface 155 may be used to request the display of the location of specific individuals within the controlled environment facility. For instance, user interface 155 may allow the user to display the location of all staff members 115 on the facility model 170, where the staff member locations displayed on the facility model 170 correspond to the last recorded location for each of the staff members that are currently within the controlled environment facility. The user interface 155 may also provide the user with the ability to display various certain areas on the facility model 170, such as restricted areas or areas of assigned supervisory responsibility for one or more staff members 115. The user interface 155 may also provide the user with the ability to display various objects on the facility model 170, such as the location of surveillance cameras 145 and the last known location of portable communication devices assigned to residents 105.

The facility model graphics engine 160 supports the display of various types of location-based information on the facility model 170. The facility model graphics engine 160 may maintain visualization settings and profiles for multiple different users of the location-based analytics user interface 155. Different profiles may be used to specify default location-based information to be displayed on the facility model 170. For instance, a user may select the default display of the location of all surveillance cameras 145 on the facility model 170. In a controlled environment facility such as a correctional facility, a user profile maintained by the facility model graphics engine 160 may be used to specify the default display of certain staff members, such as the location of all guards or the location of all guards within certain secured areas of the facility. In a controlled environment facility such as a nursing facility, a user profile may be used to specify the default display of the last recorded location of staff members such as nurses or other caregivers on the facility model 170. In certain embodiments, a staff member 115 may specify queries requesting the display of the locations of a specific subset of residents 105 on the facility model 170. For instance, in a nursing facility, a nurse may specify a query requesting the display of the location of all patients presently in the nurse's care. In certain embodiments, a staff member 115 may specify a query requesting the display of the location of a specific individual, such as a specific resident 105, a specific staff member 115, or a specific visitor 120.

The facility model graphics engine 160 may also be used to select the representations of the items that are displayed in the facility model 170. In various embodiments, the last recorded location of residents 105, staff members 115 and visitors 120 may be displayed on the facility model 170. Certain embodiments may also support the display of the location of various components of the location-based analytics system 100, such as the location of RFID detectors 110*a-n*, surveillance cameras 145 and resident terminals 150. Certain embodiments may support the display of various areas of the controlled environment facility on the facility model 170. For instance, a correctional facility may be divided into areas of responsibility that may be assigned for supervision by a staff member 115, such as a wing, cellblock, or outdoor recreational area. In other scenarios, residents may be restricted from certain areas of the facility. These various areas of the facility, the locations of individuals 105, 115 and 120 within the facility, and the locations of various items may be displayed on the facility model 170 according to the visualization selections provided by the facility model graphics engine 160, and further according to the customizations made via the location-based analytics user interface 155.

The facility model graphics engine 160 maintains personalized visualization preferences for the display of such information on the facility model 170. For instance, the user interface 155 may be used to select preferences for the display of such information on the facility model. For instance, the various zones of responsibility may be projected on the facility model 170. In addition, the names and/or other identifying information for the staff members 115 currently assigned responsibility for a particular area of the facility may also be projected on the corresponding area of the facility model 170. In other scenarios, the various duty posts assigned to staff members 115 may be displayed on the facility model 170. The user interface 155 may allow the display of such information to be configured and saved to the facility model graphics engine 160 as visualization preferences that may be displayed by default for a particular user or that may be recalled by the user.

Figure 2:
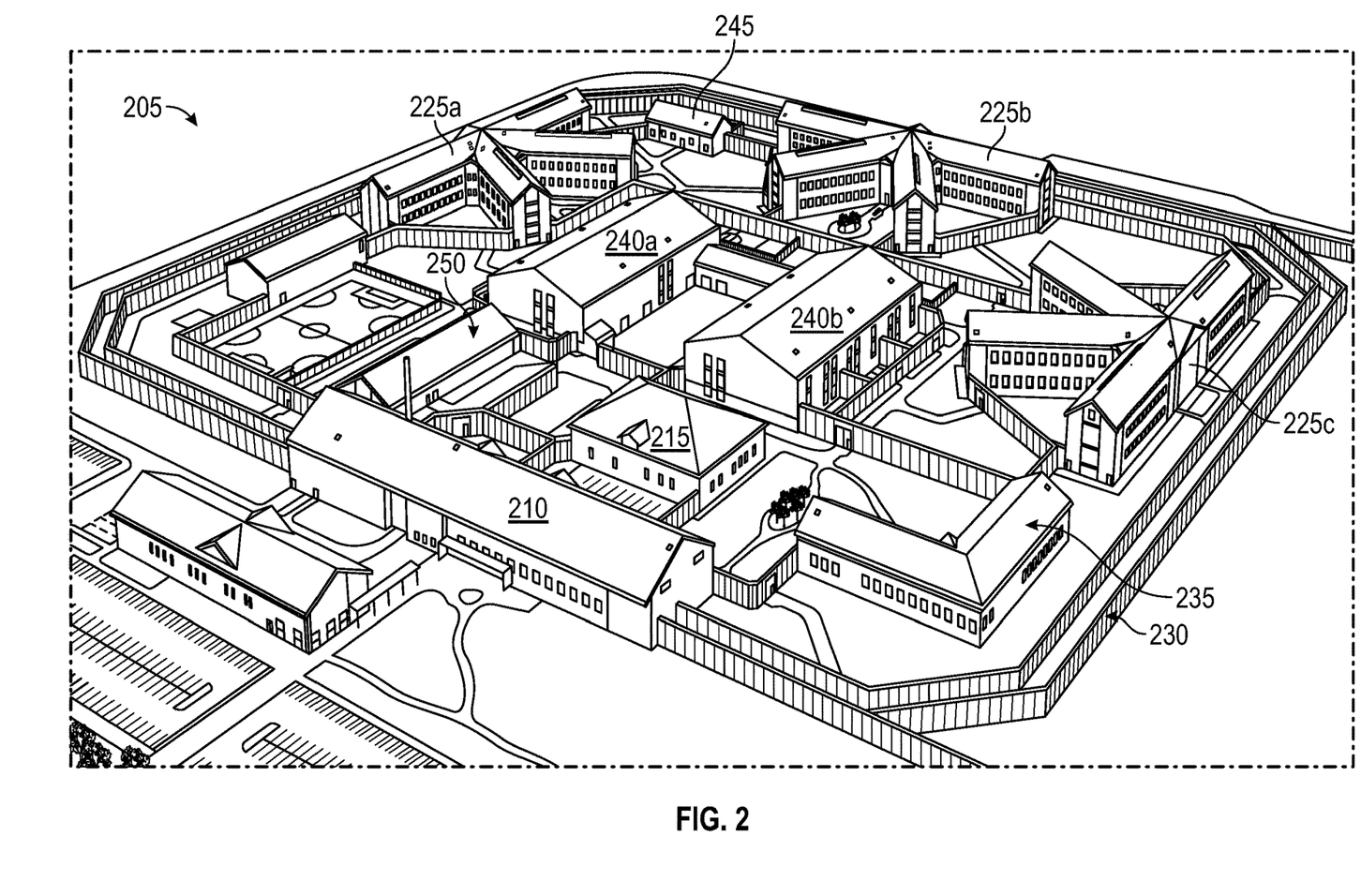
FIG. 2 is a diagram illustrating certain aspect of a controlled environment facility model used in conjunction with a location-based analytics system according to various embodiments.
Figure 3:
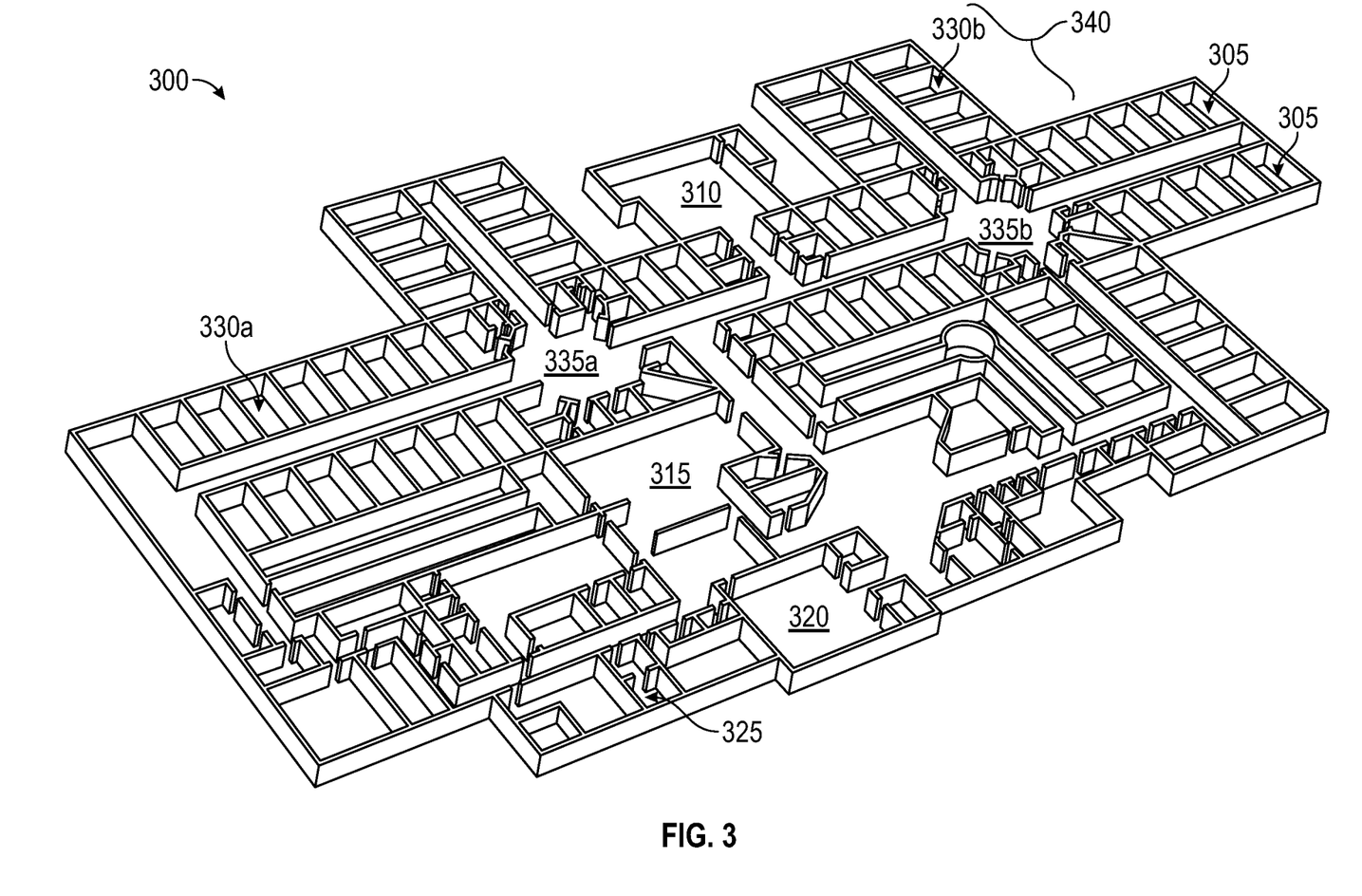
FIG. 3 is a diagram illustrating certain aspect of an additional controlled environment facility model used in conjunction with a location-based analytics system according to various embodiments.

As described in additional detail with respect to FIGS. 2 and 3, in certain embodiments, a facility model 170 may be a three-dimensional scale model of controlled environment facility or scale model of a portion of a controlled environment facility. In such embodiments, a graphics projector 165 may be used to display items on the facility model 170. The graphics projector 165 may be a projector capable of generating three-dimensional visualizations of the items displayed on the facility model 170. In certain embodiments, the graphic projector 165 may be comprised of multiple different projectors operating in a coordinated manner. The graphics projector 165 may utilize various representations for the displayed items. For instance, in a large-scale facility model 170, individuals 105, 115 and 120 may be represented by the display of representative, three-dimensional avatars by the graphics projector 165. In a smaller-scale facility model 170, individuals 105, 115, 120 may be represented by the graphics projector 165 using symbolic representations of the individuals such as colored dots or other symbols.

In some embodiments, all of the components of the location-based analytics system 100 may be co-located within the controlled-environment facility represented by the facility model 170. Alternatively, in other embodiments, one or more components of the location-based analytics system 100 may be remotely located with respect to the controlled-environment facility represented by the facility model 170.

FIG. 2 is an illustration of a controlled environment facility model 205. In certain embodiments, the controlled environment facility model 205 may be a physical scale model of certain aspects of an actual controlled environment facility. In such embodiments, the physical scale model may be constructed using technologies such as a 3-D printer that can generate scale replica of a structure such as a building and the fencing that defines a secured perimeter around a building. In certain embodiments, the controlled environment facility model 205 may be a physical scale model constructed manually out of various materials. In certain additional embodiments, the controlled environment facility model 205 is a three-dimensional, scale computer model of an actual controlled environment facility.

The controlled environment facility 205 illustrated in FIG. 2 is a correctional facility. However, as described, a controlled environment facility may be one of various other types of facilities that houses residents and includes one or more controlled areas that residents are prohibited from entering and/or leaving. As illustrated, the controlled environment facility 205 may be surrounded by security fences 230, which form a secured perimeter around the facility. Also, as illustrated, the grounds of the controlled environment facility 205 may be subdivided into multiple distinct areas via the use of additional security fences. The controlled environment facility 205 may include various buildings within its secured perimeter. The various buildings and security fences 230 serve to define various secured areas within the secured perimeter of the controlled environment facility 205.

The various buildings that comprise the controlled environment facility 205 may each have controlled entry points used to restrict the movement of residents between the buildings and the secured areas surrounding the buildings. In addition, different buildings may have different restrictions on the individuals that may enter the building. Information describing the controlled environment facility, including the different areas and locations within the controlled environment facility, may be used to configure the location-based analytics system 135. For instance, a geographic description defining the boundaries of the various different controlled outdoor areas formed by the security fences 230 of the controlled environment facility 205 may be provided to the location-based analytics system 135. Various options for visualizing these areas of the controlled environment facility on the facility model 170 may be provided by the location-based analytics system 135 to the user via the user interface 155. For instance, in a correctional setting, the user may be presented the option of displaying all cellblock areas on the facility model 170 that are currently scheduled for dining, or certain cellblock areas designated for new inmates and/or segregated inmates.

Various rules and restrictions pertaining to these defined areas of the controlled environment facility, may also be provided to the location-based analytics system 135. Using the location information describing the different areas of the controlled environment facility 205, the reported location information for individuals 105, 115, and 120 within the facility, a facility schedule 180, and the rules and restrictions pertaining to the defined areas of the facility, the location-based analytics system 135 may detect various different scenarios which may be provided to the user via the user interface 155 and/or the facility model 170. For instance, the location-based analytics system 135 may detect and display the location of any attempt by a resident 105 to access an area or building outside of authorized times, such as the resident 105 attempting to access a work assignment area outside of scheduled hours. Similarly, the location-based analytics system 135 may detect and display the location of a staff member 115 that has been detected in a restricted area or outside of an assigned area.

In the illustrated controlled environment facility 205, residents may be housed within one of three housing units 225a-c, that may each be subdivided into various sub-units. These sub-units may be referred to as wings, cellblocks, pods, or by various other terms. Entrance into the housing units 225a-c may be restricted according to various rules enforced by the controlled environment facility. For instance, entry into a particular housing unit 225a may be restricted to residents assigned to that housing unit, staff members, and certain visitors, such as outside contractors that have been granted a temporary authorization for entry into that housing unit. Residents of the housing units 225a-c are typically not allowed to exit their assigned housing unit without authorization. In certain embodiments, RFID detectors, such as described with regard to the embodiment of FIG. 1, may be installed at each entry point of each of the housing units 225a-c. As described with respect to FIG. 2, RFID detectors may also be located at various locations within the housing units 225a-c.

The controlled environment facility 205 may also include various other types of buildings, each with its own rules regarding individuals allowed to enter and/or exit the building. For instance, the controlled environment facility 205 may also include general-purpose buildings 240a-b. Such buildings may be used as dining areas, kitchens, recreational areas, educational areas, and for various other purposes that may result in a regular flow of individuals entering and exiting these buildings. For instance, the residence of the housing units 225a-c may be transferred in shifts from their respective housing unit to dining areas located within the general-purpose buildings 240a-b. The transfer of multiple shifts of residents to and from dining facilities may be repeated three times. Throughout this time, other residents may also enter and exit the general-purpose buildings 240a-b as part of work assignments, such as kitchen duty or cleaning duty.

The flow of residents 105 and staff members 115 during such transfers may be monitored by the described location-based tracking systems and provided for display via the location-based analytics system 135. In certain embodiments, the location-based analytics user interface 155 may be used to display a representation of the number of individuals within a certain area or building of the controlled environment facility at any certain time. In embodiments where the facility model includes a computer model, the generated computer model may provide the ability to select information displayed on the model in order to view detailed information associated with the displayed individuals 105, 115 and/or 120. For instance, the number of residents 105 and/or staff members 115 reported as currently within a dining area or work assignment area of the controlled environment facility may be projected onto the facility model 170 by the graphics projector 165.

In certain controlled environment facilities, certain residents may be separated from the general population and housed in a high-security housing unit 235. In such scenarios, a high-security housing unit 235 may have additional rules regarding entry and exit. For instance, additional identification verifications may be required to enter and/or exit a high-security housing unit. Residents assigned to a high-security housing unit 235 may be allowed outside of the high-security housing unit on a highly restricted basis based on rules that may be particular to and individual resident. A high-security housing unit 235 may also have additional restrictions compared to the general population housing units 225a-c with regard to the entry of staff members.

In certain embodiments, the location-based analytics system 135 may be configured to implement specific visualization and alerting rules for high-security access buildings or areas, such as a high-security housing unit 235. For instance, the location-based analytics system 135 may allow the user to display information on the facility model 170 describing all individuals 105, 115 and 120 entering and exiting a high-security housing unit 235. In addition, the location-based analytics system 135 may be configured to immediately display and alert conditions on the facility model 170 upon the detection of an unauthorized individual 105, 115 or 120 in or near the high-security housing unit 235.

The controlled environment facility 205 may also include a medical facility 245 that may be used to provide medical care to the residents. Various rules may restrict the individuals that may enter and/or exit the medical facility 245. In certain scenarios, a resident may be assigned a housing unit within the medical facility 245 on a temporary basis. In other scenarios, a resident may be taken to the medical facility 245 to receive treatment, after which the resident will return to their assigned housing unit 225a-c. In order to restrict access to medications stored at the medical facility 245, additional rules may restrict the entry of staff members to the medical facility to those with duties related to medical care.

In certain embodiments, the location-based analytics system 135 may be configured to display the location of individuals 105, 115 and 120 on the facility model 170 based on various classification criteria for these individuals. For instance, the location-based analytics user interface 155 may be used to display the location of all residents 105 currently assigned to a housing unit within the medical facility 245 or the location of all residents 105 currently scheduled to be at a specific work assignment, such as the cleaning of the medical facility 245. In certain embodiments, the location-based analytics system 135 may provide the ability to display the location of all individuals associated with certain groups. For instance, the user interface 155 may be used to display the location of all residents 105 known to be affiliated with a specific gang or other group within the controlled environment facility. In addition, the user interface 155 may allow the user to display the location on the facility model 170 of a specific resident 105, staff member 115 or visitor 120.

In certain embodiments, a user may configure various rules and alerts regarding residents and/or groups of residents. For instance, a user may configure a rule signaling an alert condition when two or more specific residents are detected within a specified proximity to each other. The user may also configure rules signaling an alert condition if specific groups of residents are congregated within a specified proximity. In certain embodiments, alerts may be configured to display alert information on the facility model 170. Certain embodiments may allow the configuration of auditory alerts for specific alert conditions. Certain embodiments may allow the configuration of high-priority alert conditions, such as a missing resident, that results in the issuance of a facility-wide alert notification via all available communication devices utilized by staff members 115. In certain embodiments, alert conditions may be configured that are coupled to the tracking of certain individuals. For instance, in scenarios where an individual is detected that is not wearing a required RFID chip or wearing an unauthorized RFID chip, an alert condition may be signaled and the location of the unauthorized individual may be tracked and displayed on the facility model 170. In certain embodiments, a staff member 115 may query past alert conditions pertaining to specific individuals 105, 115, 120 and/or pertaining to specific locations within the controlled environment facility. The queried alert conditions may then be visualized on the facility model 170.

In certain embodiments, the user may be provided with the ability to visualize the tracked movement of individuals within the controlled environment facility. In such embodiments, the user interface 155 may provide the ability to search and visualize the locations of one or more individuals over time. For instance, the user interface 155 may provide the ability to visualize the movement of all individuals within a specific area of the controlled environment facility during a specified duration. The user interface 155 may also provide the ability to visualize the movement of specific individuals throughout the controlled environment facility during a specified duration. The user interface 155 may also provide the ability to formulate queries requesting the display of individuals detected at specific locations within the controlled environment facility during a specified duration. Based on the visualization preferences specified by the facility model graphics engine 160, the movement of individuals may be visualized and animated on the facility model 170. The user interface 155 may provide the ability to manipulate the animated movement information by slowing down or speeding up the animation, or changing the information displayed on the facility model 170.

As described, residents of the controlled environment facility 205 may be provided with various types of visitation services, which may include the described video visitations that may be conducted via a resident terminal. Residents may also be allowed face-to-face interactions with visitors at a visitation building 210. As illustrated, the visitation building 210 forms a portion of the secured perimeter 230 and provides an entry point into the secured perimeter 230. In certain scenarios, the visitation building 210 may serve as sole means of entry into the secured perimeter 230 of the controlled environment facility 205. Accordingly, entering and exiting the visitation building 210 may require highly restrictive identification procedures for residents, staff members, and visitors. For instance, residents may be allowed within the visitation building 210 only during scheduled visitation periods. Visitors, such as friends and family of residents, may be received at the visitation building 210 and may be allowed to visit with a resident according to various rules and regulations. Visitors may be required to wear identification that includes an RFID chip while within the visitation building 210. As described, the location of visitors 120 may be displayed on the facility model 170 and various alert scenarios associated with the detection of visitors 120 in an unauthorized area may be triggered and displayed on the facility model.

In certain embodiments, the RFID chip worn by a visitor 120 may be collected upon the visitor 120 leaving the controlled environment facility. In such embodiments, location information collected and stored by the RFID chip while worn by the visitor 120 may be downloaded by staff members 115. The downloaded movement information may then be displayed on the facility model 170 in order to visualize the movement of the visitor 120 within the controlled environment facility. The RFID chips of other individuals, such as staff members 115 and residents 105, may be similarly used to download and visualize movement information recorded by the RFID chip.

Certain controlled environment facilities may also include administrative buildings 215 within the secured perimeter that are used to provide residents with special services that may require interaction with visitors. For instance, residents may be provided with educational and training classes and counseling services that are guided by visitors to the controlled environment facility 205. Such special-purpose visitors may be granted additional privileges allowing entry within the secured perimeter 230, but only with respect to the administrative building 215. The administrative building 215 may also include areas in which residents may be allowed to meet with legal counsel. As described, such individuals that regularly visit the controlled environment facility 205 may be assigned a wearable RFID chip on a permanent basis. The location of such special-purpose visitors may be displayed on the facility model 170. In certain embodiments, information describing these special-purpose visits may also be displayed on the facility model, such as a description of the special-purpose visitor, the time remaining in the scheduled visitation, and/or information describing the residents 105 that are scheduled to participate in the visitation.

A controlled environment facility 205 may also include limited access buildings 250 that may house certain operations, such as laundry, that are run by residents. Entry into such limited access buildings 250 may be limited to residents that have work assignments, or other duties or privileges, which requires entry to a particular limited access building 250. However, such residents may still be prohibited from entering the limited access building 250 outside of scheduled work hours, or other authorized access times. Staff members however may have no restrictions on entry into a limited access building 250. As described, the flow of residents 105 and staff members 115 between such work assignments may be visualized on the facility model 170, along with any unauthorized attempts by a resident 105 or staff member 115 to access a work assignment area outside of scheduled working hours.

As illustrated, the areas around the buildings within the secured perimeter 230 may be subdivided by various security fences, thus forming multiple controlled outdoor areas. Residents may be allowed free movement within one or more of these controlled outdoor areas according to a schedule that limits the use of an outdoor controlled area to a specific group of inmates for a specific duration. For instance, the controlled environment facility 205 may include an outdoor recreational area 220 that may be used by residents for sporting activities and exercise. Similar to the access to the dining areas of the general-purpose buildings 240a-d, residents may be similarly allowed to use such outdoor recreational areas 220 in shifts such that only specific groups of residents are authorized within the recreational area 220 during a specific period. Similar to the buildings of the controlled environment facility 205, entering and exiting an outdoor controlled area such as the recreational area 220 may be through gates or other controlled entryways that include RFID detectors configured to identify each individual that enters or exits an outdoor controlled area.

The location-based analytics system 135 may provide the ability to display various information about the individuals within a controlled area, such as an outdoor recreation area 220. For instance, the location-based analytics user interface 155 may allow the ability to display the locations of all inmates within the outdoor recreation area 220, where the representation of each inmate on the facility model 170 is color-coded according to known gang affiliations for each inmate. In addition, the facility model 170 may be used to display the location of one or more specific inmates 105 and/or staff members 115 within the outdoor recreation area 220, in order to monitor and investigate suspicious or illegal behavior.

FIG. 3 is an illustration of another controlled environment facility model 300. Like the controlled environment facility model 205 of FIG. 2, the controlled environment facility model 300 may be a physical scale model of a portion of an actual controlled environment facility. As illustrated, the controlled environment facility model 300 may delineate one or more controlled areas within a portion of the controlled environment facility. The controlled environment facility model 300 may be a scale model constructed using a 3-D printer, manually, or may be a computer model. The illustrated controlled environment facility model 300 may be a scale model of an entire facility, such as a nursing home. In other scenarios, the controlled environment facility model 300 may be a scale model of a portion of a facility such as a wing or cellblock of a correctional facility housing unit.

Similar to the smaller-scale controlled environment facility of FIG. 2, the controlled environment facility 300 includes multiple different controlled areas that may have access restriction policies that may differ for residents, staff members and visitors. For instance, a controlled environment facility 300 may include a reception area 310, by which visitors may be required to enter the facility. In certain scenarios, visitors may be required to obtain authorization to go beyond the reception area 310, and may be required to wear an RFID tag to enter further into the controlled environment facility 305. The RFID tag assigned to the visitor may uniquely identify the individual visitor, or may just identify the individual as a visitor. The assigned RFID tag may also specify certain information about the visitor, such as the resident(s) that the visitor is affiliated with and/or restrictions on the visitor. In other scenarios, visitors may be allowed to enter the controlled environment facility through the reception area 310 without any form of identification. As described, residents and visitors of the controlled environment facility 300 may also be required to wear identification that includes an RFID chip.

In certain scenarios, the controlled environment facility 300 may include one or more duty posts 335*a-b*. In the illustrated facility, the duty posts 335*a-b* may be nurse stations at which staff members are stationed in order to supervise and care for residents of the controlled environment facility 300. Both visitors and residents may be expected to be in and around the duty posts 335*a-b*. Residents may be assigned to one of various rooms 305 provided by the controlled environment facility 300. Each individual room 305 may house any number of residents. In certain scenarios, residents may be free to leave their assigned rooms 305 at all times. In other scenarios, residents may be required to stay within their assigned rooms, at least at certain times. In certain scenarios, residents may not be allowed to leave their assigned rooms without authorization. In certain embodiments, the entrance to each individual room 305 may include an RFID detector.

The location-based analytics system may be configured to display various of these location-based aspects of the controlled environment facility 300 on the corresponding facility model. In certain embodiments, the user may be provided the ability to display the location of all duty posts 335*a-b* and the locations of the staff members 115 assigned to each of these duty posts. The individual duty posts 335*a-b* and staff members 115 assigned to each individual duty post may be color-coordinated or otherwise visualized according to specifications provided by the user.

In scenarios where residents are allowed to leave their rooms 305, residents may nonetheless be restricted to certain areas of the controlled environment facility 300. For instance, a resident assigned to room 330*b* may be required to remain within that wing 340 of the controlled environment facility 300. In support of such restrictions, RFID detectors may be located at all exit points to wing 340. In certain scenarios, the resident assigned to room 330*b* may be required to remain within wing 340 and may also seek assistance and care at duty post 335*b*, such that RFID detectors may be placed at all exit points from duty post 335*b*.

The location-based analytics system may also be configured to detect and display violations of various rules, such as a resident leaving a controlled area. In certain embodiments, the user may be provided the ability to configure alert conditions that will be displayed on the facility model when a resident leaves a controlled area. For instance, any attempt by the resident assigned to room 330*b* to leave wing 340 or duty post 335*b* may be detected by the location-based analytics system and a corresponding alert condition made be displayed on the facility model. The alert condition that is displayed on the facility model may identify the resident assigned to room 330*b*. In certain embodiments, the alert condition that is displayed may be selected based on the location of the controlled area violation. For instance, a high alert condition may be displayed on the facility model upon detecting the resident of room 330*b* leaving wing 340 through an external door while a lower alert condition may be displayed upon detecting the resident of room 330*b* leaving wing 340 for another area within the controlled environment facility 300 via the duty post 335*b*.

The location-based analytics system may also be used to detect and display various conditions pertaining to particular residents, or particular groups of residents. For instance, in a scenario where the resident of room 330*b* has been instructed to stay away from the resident of room 330*a*, the location-based analytics system may detect movement of the resident of room 330*b* near room 330*a*, or near the resident of room 330*a* wherever the resident of room 330*a* is presently located. Such conditions may be detected and displayed on the facility model according to visualization settings specified by the user.

A controlled environment facility 300 may include one or more general-purpose areas 315 that residents are generally allowed to enter freely. For instance, a general-purpose area 315 may serve as a dining area and recreation area throughout the day. In certain scenarios, residents may be prohibited from the general-purpose area 315 at certain scheduled times. Staff members and visitors may also enter the general-purpose area 315 freely. RFID detectors may be located at all entry points to the general-purpose area 315. The location-based analytics system may provide a visualization of the location of residents, staff members and visitors within a general-purpose area 315 as well as provide information such as the duration an individual has been within a general-purpose area 315.

In certain embodiments, the location-based analytics system may be used to periodically determine the location of all residents of the controlled environment facility 300. In certain embodiments, the location-based analytics system may also identify instances where no movement has been detected for a particular resident for a specified duration. For instance, the user interface may allow the user to display the last known location for all residents for which no movement has been detected over a certain duration, such as the last three hours. The user interface may also allow the user to display the location of staff members nearest to the last known location for the resident.

The controlled environment facility 300 may also include limited access areas such as a receiving area 320. In certain scenarios, a receiving area 320 may be used to receive deliveries from vendors and delivery services. Staff members of the controlled environment facility 300 may be allowed to enter the receiving area 320 freely, while residents and visitors may be restricted from the receiving area 320. Delivery drivers may be allowed in the receiving area 320, but may be prohibited from entering further into the controlled environment facility 300. In certain embodiments, RFID detectors may be located at the entrance to the receiving area 320 and at the loading bay receiving doors. In such scenarios, the location-based analytics system may detect and display alert condition indicating the entry of any resident or visitor into the receiving area 320. In certain embodiments, the location-based analytics system may display a low-level alert condition indicating an open external door in an area such as receiving area 320.

In certain scenarios, the controlled environment facility 300 may include restricted areas that are limited to certain staff members. For instance, the controlled environment facility 300 may provide various medical services to residents. Accordingly, the controlled environment facility may maintain a significant supply of prescription medications that may be stored in a secured room 325. Access to such secured rooms 325 may be limited to specific staff members of the controlled environment facility 300. RFID detectors may be located at entry to the secured room 325. The location-based analytics system may be configured to display information identifying all individuals determined to be located near areas such as secured room 325.

The location-based analytics system may also provide the user with various investigative features that provide the ability to visualize the movement of individuals within the controlled environment facility. For instance, in an investigation regarding access to secured room 325, the movement of one or more staff members throughout the controlled environment facility leading up to a specific incident may be visualized on the facility model. Such investigative tools may allow the visualization of a single individual, a specifically identified group of individuals, or a classification of individuals. For instance, the location-based analytics system may support the display on the facility model of all movement of a specific staff member within the controlled environment facility leading up to the incident. In addition, the location-based analytics system may support the display on the facility model of all movement of a specific staff member and one or more suspected residents leading up to the incident. In addition, the location-based analytics system may support the display of the facility model of all movement of all staff members leading up to the incident.

The foregoing has outlined the features and technical advantages of the present invention in order that the detailed description of the invention that follows may be better understood. It should be appreciated that the conception and specific embodiments disclosed may be utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A location-based analytics system for operation in a controlled-environment facility, the system comprising:
    a computer-generated model of the controlled environment facility;
    a plurality of sensors located within the controlled-environment facility, each of the plurality of sensors configured to detect individuals located within a first proximity to the sensor;
    an analytics system configured to determine identities of the individuals detected by the plurality of sensors and further configured to report a location of the identified individuals within the controlled-environment facility;
    a user interface providing an ability to select one or more of the identified individuals to display the location of; and
    a graphics generator configured to generate a representation of the one or more selected individuals in the computer-generated model of the controlled environment facility, with the representation of the one or more selected individuals shown at a location in the computer-generated model of the controlled environment facility corresponding to the reported location of the one or more selected individuals within the controlled-environment facility.

2. The location-based analytics system of claim 1, wherein the computer-generated model of the controlled environment facility is viewed on a display device.

3. The location-based analytics system of claim 1, wherein the computer-generated model of the controlled environment facility is a three-dimensional computer-based model of the controlled-environment facility.

4. The location-based analytics system of claim 3, wherein the three-dimensional computer-based model of the controlled-environment facility is viewed on a display device.

5. The location-based analytics system of claim 3, further comprising a three-dimensional projector configured to project the three-dimensional computer-based model of the controlled-environment facility and/or three-dimensional representations of the one or more selected individuals in the three-dimensional computer-based model of the controlled-environment facility.

6. The location-based analytics system of claim 1, wherein the plurality of sensors comprises RFID (Radio Frequency Identification) detectors configured to detect RFID chips worn by the individuals.

7. The location-based analytics system of claim 1, further comprising:
    a plurality of cameras located within the controlled-environment facility, wherein each of the plurality of cameras is configured to capture images of individuals located within a second proximity to the camera; and
    an image analytics system configured to determine the identity of the individuals in the captured images and further configured to report a location within the controlled-environment facility of the individuals identified in the captured images.

8. The location-based analytics system of claim 7, wherein the one or more of the plurality of cameras is a component of a communications terminal located within the controlled-environment facility.

9. The location-based analytics system of claim 1, wherein the graphics generator is further configured to generate a representation of one or more controlled areas of the controlled-environment facility in the computer-generated model of the controlled environment facility.

10. The location-based analytics system of claim 9, wherein individuals with a first classification are prohibited from entering a first controlled area of the one or more controlled areas and the graphics generator is further configured to generate display of an alert condition in the computer-generated model of the controlled environment facility, wherein the alert condition is displayed at a location in the computer-generated model of the controlled environment facility corresponding to the reported location of a first individual of the first classification of individuals within the first controlled area.

11. A method for providing a location-based analytics and visualization system for operation in a controlled-environment facility, the method comprising:
   detecting individuals located within a first proximity to one or more sensors located within the controlled-environment facility;
   determining identities of the individuals detected by the one or more of sensors;
   reporting a location of the identified individuals within the controlled-environment facility;
   accepting a selection to display the location of one or more selected individuals of the identified individuals in a computer-generated model of the controlled environment facility; and
   generating a representation of the one or more selected individuals in the computer-generated model of the controlled environment facility, with the representation of the one or more selected individuals shown at a location in the computer-generated model of the controlled environment facility corresponding to the reported location of the one or more selected individuals within the controlled-environment facility.

12. The method of claim 11, wherein the computer-generated model of the controlled environment facility is viewed on a display device.

13. The method of claim 11, wherein the computer-generated model of the controlled environment facility is a three-dimensional computer-based model of the controlled-environment facility.

14. The method of claim 13, wherein the three-dimensional computer-based model of the controlled-environment facility is viewed on a display device.

15. The method of claim 13, wherein the three-dimensional computer-based model of the controlled-environment facility and/or three-dimensional representations of the one or more selected individuals in the three-dimensional computer-based model of the controlled-environment facility are projected using a three-dimensional projector.

16. The method of claim 11, wherein the plurality of sensors comprises RFID (Radio Frequency Identification) detectors configured to detect RFID chips worn by the individuals.

17. The method of claim 11, further comprising:
   capturing images of individuals located within a second proximity to one of a plurality of cameras located within the controlled-environment facility;
   determining the identity of the individuals in the captured images; and
   reporting a location within the controlled-environment facility of the individuals identified in the captured images.

18. The method of claim 17, wherein the one or more of the plurality of cameras is a component of a communications terminal located in the controlled-environment facility.

19. The method of claim 11, further comprising:
   determining a group of identified individuals from one or more specific groups of individuals are congregated within a specified proximity; and
   displaying alert information indicating the two or more specific identified individuals in the computer-generated model of a controlled environment facility, shown at the location in the computer-generated model of the controlled environment facility corresponding to the reported location of the two or more specific identified individuals within the controlled-environment facility.

20. A computer readable non-transitory medium having program instructions stored thereon that upon execution by a controlled-environment facility location-based analytics system, cause the controlled-environment facility location-based analytics system to:
   detect individuals located within a first proximity to one or more sensors located within a controlled-environment facility;
   identify the individuals detected by the one or more of sensors;
   report locations of each identified individual within the controlled-environment facility;
   accept a selection to display the location of one or more selected individuals of the identified individuals in a computer-generated model of the controlled environment facility; and
   generate a representation of the one or more selected individuals in the computer-generated model of the controlled environment facility, the representation of the one or more selected individuals projected at a location in the computer-generated model of the controlled environment facility corresponding to the reported location of the one or more selected individuals within the controlled-environment facility.

* * * * *

UNITED STATES PATENT AND TRADEMARK OFFICE
CERTIFICATE OF CORRECTION

| | |
|---|---|
| PATENT NO. | : 11,227,132 B1 |
| APPLICATION NO. | : 16/724887 |
| DATED | : January 18, 2022 |
| INVENTOR(S) | : Ray |

Page 1 of 1

It is certified that error appears in the above-identified patent and that said Letters Patent is hereby corrected as shown below:

On the Title Page

Item (73), delete "Securas Technologies, LLC," and insert -- Securus Technologies, LLC -- therefor.

Signed and Sealed this
Twenty-second Day of February, 2022

Drew Hirshfeld
*Performing the Functions and Duties of the
Under Secretary of Commerce for Intellectual Property and
Director of the United States Patent and Trademark Office*